United States Patent [19]

Dehennau et al.

[11] Patent Number: 4,997,616
[45] Date of Patent: Mar. 5, 1991

[54] PROCESS FOR PRODUCING, BY BLOWN FILM EXTRUSION, A SLEEVE OF VINYL CHLORIDE-BASED RESIN, AT LEAST ONE FACE OF WHICH IS MATTE IN APPEARANCE

[75] Inventors: Claude Dehennau, Waterloo; Serge Dupont, Vilvoorde, both of Belgium

[73] Assignee: Solvay & Cie (Societe Anonyme), Brussels, Belgium

[21] Appl. No.: 420,161

[22] Filed: Oct. 6, 1989

[30] Foreign Application Priority Data

Oct. 10, 1988 [FR] France ................. 88 13404

[51] Int. Cl.$^5$ ............................................. B29C 47/86
[52] U.S. Cl. ................................... 264/519; 264/564; 264/209.7; 425/379.1
[58] Field of Search ............. 264/564, 519, 327, 209.7, 264/209.8, 237; 425/378.1, 379.1, 380, 382.4, 326.1

[56] References Cited

U.S. PATENT DOCUMENTS

| | | |
|---|---|---|
| 2,876,497 | 3/1959 | Alexander . |
| 3,331,103 | 7/1967 | Fox ................. 425/378.1 |
| 3,769,379 | 10/1973 | Hinrichs ................ 264/327 |
| 3,920,782 | 11/1975 | Cogswell ............. 264/209.7 |
| 3,936,417 | 2/1976 | Ronden ................ 264/209.7 |
| 3,950,118 | 4/1976 | Adair ................. 425/379.1 |
| 4,216,253 | 8/1980 | Bonnebat et al. ....... 425/378.1 |
| 4,359,439 | 11/1982 | Fritsch et al. ........... 264/327 |
| 4,663,107 | 5/1987 | Takada et al. ........... 264/519 |
| 4,664,866 | 5/1987 | van der Heijden ........ 264/564 |

FOREIGN PATENT DOCUMENTS

| | | |
|---|---|---|
| 230105 | 4/1959 | Australia . |
| 0047839 | 3/1982 | European Pat. Off. . |
| 0180571 | 5/1986 | European Pat. Off. . |
| 0185863 | 7/1986 | European Pat. Off. . |
| 0191130 | 8/1986 | European Pat. Off. . |
| 0210108 | 1/1987 | European Pat. Off. . |
| 2610972 | 9/1977 | Fed. Rep. of Germany . |
| 1479973 | 5/1967 | France . |
| 5542802 | 9/1978 | Japan . |
| 1157245 | 7/1969 | United Kingdom ............... 264/519 |

*Primary Examiner*—Jeffery Thurlow
*Attorney, Agent, or Firm*—Spencer & Frank

[57] ABSTRACT

The extruded sleeve is cooled at the end of the die by a circulation of a refrigerant fluid whose temperature To satisfies the relationship:

$$Tm - \frac{0.04 \cdot Tc}{(1 - 0.32 \ G^{0.1525})} -$$

$$35° \text{ C.} \leq To \leq Tm - \frac{0.04 \cdot Tc}{(1 - 0.32 \ G^{0.1525})} - 2° \text{ C.}$$

G being equal to:

$$G = \frac{\rho \ C_p \ \bar{V} H^2}{\lambda L}$$

Tm and V being the mean temperature of the resin at the exit of the die and its mean extrusion velocity,
Tc is a temperature characteristic of the extruded resin,
$\rho$, Cp and $\lambda$ are the density, the specific heat and the thermal conductivity of the resin,
H is the height of the die gap in the refrigerated zone,
L is the length of the refrigerated zone.

5 Claims, 1 Drawing Sheet

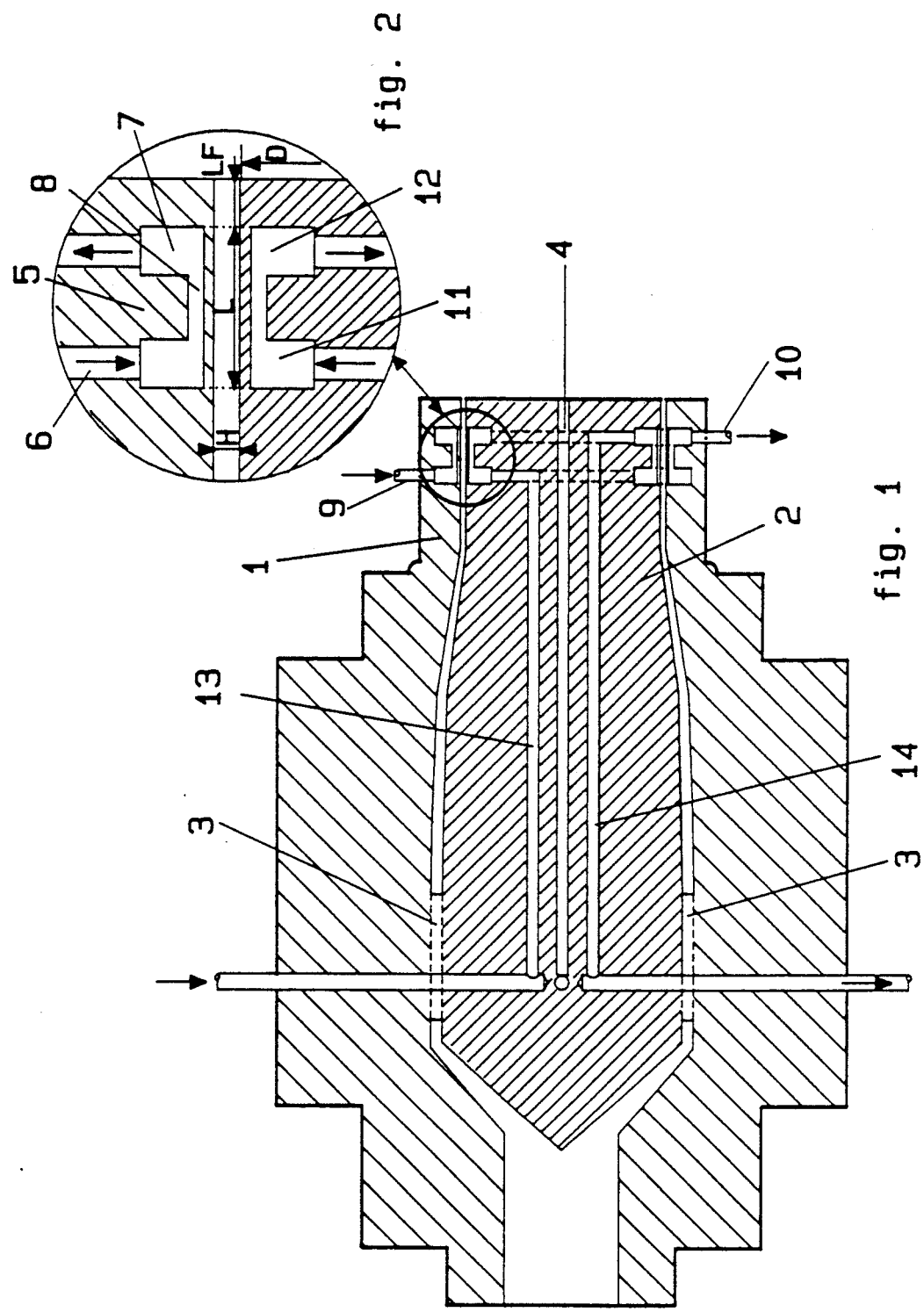

PROCESS FOR PRODUCING, BY BLOWN FILM EXTRUSION, A SLEEVE OF VINYL CHLORIDE-BASED RESIN, AT LEAST ONE FACE OF WHICH IS MATTE IN APPEARANCE

The present invention relates to a process for producing, by blown film extrusion, a sleeve of vinyl chloride-based resin, at least one face of which has a matt surface and which is particularly suitable for producing sterilizable packaging bags.

Vinyl chloride-based resins, that is to say resins containing at least 70 mol % of units derived from vinyl chloride, constitute a choice material for the production of tubular sleeves which can be employed especially for the production of packaging bags and, in particular, of bags for packaging medical liquids.

To produce such sleeves, the resin is generally extruded in the form of a tube and air or another gas is blown into the extruded tube so as to give the latter the diameter of the desired sleeve, this sleeve being then flattened by passing between rolls, and generally stored in reel form.

When the operation is carried out in this way, using normal extrusion conditions, a sleeve whose two faces are perfectly smooth and free from any fault is generally obtained.

It has been found, however, that a sleeve of this kind is not ideally suited for producing bags. In fact, when the sleeve thus produced is unreeled, sectioned and optionally welded to manufacture bags, it is found that the opposed faces of the sleeve are in practice adhesively bonded to each other because of their surface quality and that it is anything but easy to separate them either in order to introduce filling spouts or to introduce the product to be packaged therein. The surface quality of the outer faces of the sleeve may also be found disadvantageous because it may result in difficulties in unreeling the sleeve or in the production of bags which tend to block together when stacked empty.

To overcome this disadvantage, it is certainly possible to incorporate so-called slip agents, such as waxes, into the vinyl chloride-based resin used to produce the sleeve. However, this means is generally costly and, in addition, it may turn out to be unacceptable, for example when the sleeve is employed for the production of bags for packaging medical liquids which must not be soiled by contaminants such as waxes extracted by migration from the container.

In the case of the production of bags for packaging medical liquids, the perfect surface quality of the initial sleeve is found, furthermore, to be all the more unfortunate, since the bags must frequently undergo heat-sterilization treatments which reinforce the abovementioned bonding or adhesive effect.

Another means for producing a sleeve of vinyl chloride-based resin not exhibiting the abovementioned surface disadvantage consists in performing the extrusion of the initial tube so that at least one of its surfaces is cooled to a temperature well below the extrusion temperature, this being done upstream of the exit orifice of the extrusion die. Such a process is described succinctly in particular in Japanese Patent Application No. 46-4,910, filed on Jan. 13, 1966, which teaches merely that the cooling must be performed solely at the end of the extrusion die.

In European Patent Application No. 0,210,108, filed subsequently, it is explained that the refrigeration must not be carried out over a distance of more than 30 mm from the die exit orifice and that the refrigeration must be such that the surface resin is cooled by 5° to 60° C.

It has been found, however, that these conditions are insufficient to guarantee, ipso facto, the production of a sleeve at least one of whose faces exhibits a sufficient mattness to abolish any subsequent disadvantage due to the bonding or blocking phenomena. The objective of the present invention is consequently to provide a process of the type referred to above, which results in a sure manner in the production of a sleeve at least one of whose faces has a sufficient mattness to permit the production of packaging bags while avoiding any untimely bonding phenomenon.

The invention relates, therefore, to a process for producing, by blown film extrusion, a sleeve of vinyl chloride-based resin, at least one face of which is matt in appearance and which is particularly suitable for producing packaging bags which can be optionally sterilized, in which at least one of the faces of the extruded sleeve is cooled superficially upstream of the exit orifice of the extrusion die by means of a circulation of a refrigerant fluid which is characterized in that the temperature To of the refrigerant fluid is chosen so as to satisfy the relationship:

$$Tm - \frac{0.04 \cdot Tc}{(1 - 0.32\, G^{0.1525})} - 35°C. \leq To \leq Tm - \frac{0.04 \cdot Tc}{(1 - 0.32\, G^{0.1525})} - 2°C.$$

in which:

Tm is the mean temperature of the resin at the die exit,

Tc is a temperature characteristic of the extruded resin and is given by the relationship:

$$Tc = \frac{R\, Tm^2}{E}$$

in which E is the activation energy of the resin, measured by means of a capillary viscometer, at the temperature Tm, R being the universal gas constant, and G is given by the formula:

$$G = \frac{\rho\, C_p\, \overline{V}\, H^2}{\lambda L}$$

in which:

$\rho$ is the density of the resin, $C_p$ is the specific heat of the resin, $\overline{V}$ is the average extrusion velocity of the resin in the refrigerated zone, H is the height of the die gap in the refrigerated zone, L is the length of the refrigerated zone, and $\lambda$ is the thermal conductivity of the resin.

The temperature To is preferably chosen so as to satisfy the relationship:

$$Tm - \frac{0.40 \cdot Tc}{(1 - 0.32\, G^{0.1525})} - 30°C. \leq To \leq Tm - \frac{0.40 \cdot Tc}{(1 - 0.32\, G^{0.1525})} - 4°C.$$

The vinyl chloride-based resin used in the process according to the invention is preferably a plasticized vinyl chloride homopolymer or copolymer of Shore A hardness of between 60 and 95, measured according to ASTM standard D2240, the plasticizer content being from 35 to 75 parts by weight. A vinyl chloride copolymer means a copolymer containing at least 70% by weight of units derived from vinyl chloride, the comonomer(s) employed for its production being chosen especially from the group consisting of olefins, such as ethylene, propylene and styrene and esters, such as vinyl acetate and alkyl acrylates and methacrylates. As a general rule, however, preference is given to resins based on vinyl chloride homopolymers.

The plasticizers which can be employed may be chosen from the usual monomeric or polymeric plasticizers for vinyl chloride polymers, the choice not being critical. By way of examples of such plasticizers, no limitation being implied, there may be mentioned phthalates, sebacates, adipates, trimellitates, citrates, phosphates and polyesters such as poly-ε-caprolactone and mixtures thereof.

The superficial refrigeration of one or both faces of the extruded sleeve is obtained by circulating a refrigerant fluid, generally oil or another fluid, through the end of the die and/or of the core of the extrusion device. This refrigeration is preferably performed by a thin annular film of refrigerant fluid (of the order of one millimeter in thickness) circulating axially, that is to say in the direction of the extrusion axis, so as to provide a symmetrical cooling of the sleeve resulting in a uniform matting. The length of the refrigerated zone may vary between 3 and 30 mm and the downstream end of the refrigerated zone may be situated at a distance which varies between 0 and 60 mm from the die exit orifice. As a general rule, the distance between the start of the refrigerated zone and the die exit orifice should not exceed 70 mm, so as not to generate an unacceptable back-pressure in the extrusion device upstream of the refrigerated zone.

The temperature $Tm$ of the extruded resin is easily determined, especially by means of thermometric probes; this temperature generally varies between 180° and 195° C.

The coefficient G is a function of the thermal regime at the end of the extrusion die and results from the interaction between a lateral conductance effect characterized by the relationship:

$$\lambda \frac{(Tm - To)}{H^2}$$

and an axial conductance effect characterized by the relationship:

$$\frac{\rho C_p \overline{V}}{L} (Tm - To).$$

This coefficient takes into account, in fact, the geometric characteristics of the refrigeration zone and extrusion conditions, in particular the extrusion velocity.

The temperature $Tc$ can be deduced from the rheological properties of the resin employed and can be quantified on the basis of capillary viscosity measurements.

In the development of the process in accordance with the invention, the mattness of the sleeve produced was measured with an apparatus of the "Perth-o-meter" type, based on an averaged measurement of the amplitude of the movements of a needle at right angles to the surface to be characterized, generally expressed in microns. In this case, it is considered that a mattness of 0.5 micron corresponds to the limit of appearance of the mattness phenomenon. However, it has been found that the mattness needed to obtain a sleeve permitting the production of packaging bags which can be sterilized without exhibiting interfering bonding phenomena must be equal to at least 2 microns.

To determine this value, adhesion tests were carried out on matt sleeves in accordance with ASTM standard D1876 and mattness was measured, and it was found that an acceptable adhesion value is obtained, that is to say lower than 2.4 N/cm (measured at 23° C. after sterilization for 30 minutes at 121° C. and with a pull speed of 250 mm/min), for samples whose measured mattness is equal to at least 2 microns.

In the relationship which gives the temperature $To$ in the process in accordance with the invention, the expression:

$$Tm - \frac{0.40 \cdot Tc}{(1 - 0.32 \, G^{0.1525})}$$

gives, in fact, the temperature which the refrigerant fluid must be given to obtain a mattness of 0.5 microns, corresponding to the onset of the appearance of the matting phenomenon, the complete relationship, in its turn, giving the temperature at which the refrigerant fluid must be to obtain a mattness equal to at least 2 microns, secondary parameters being taken into account, such as the distance between the end of the refrigerated zone and the die exit orifice, the self-heating effects, single- or two-face matting, and the like.

It has also been found that the draw velocity applied to the sleeve on leaving the extrusion die has a favourable influence on sleeve matting. It is therefore preferred that this draw velocity should be equal to at least 3 m/min and should preferably be between 3 m/min and 13 m/min. This velocity is added to the mean velocity of the resin at the die exit.

Finally, it has further been found that an abrupt change in the geometry of the resin flow channel at the end of the die and after the refrigeration zone, such as a sudden reduction in the flow cross-section of the extruded resin, has the effect of increasing the amplitude of the matting obtained, at equal refrigerating fluid temperature.

The process in accordance with the invention is further illustrated and explained in greater detail by the description of the production trials, which follows.

For these trials, a vinyl chloride-based resin composition was employed, comprising, per 100 kg of a polyvinyl chloride manufactured and marketed by Solvic S.A. under the trademark Solvic 271, 44 liters of dioctyl phthalate, 5 liters of epoxidized soya bean oil, 2 kg of a calcium and zinc-based stabilizer and 0.04 kg of an optical whitener.

The physical characteristics of this composition are repeated in Table I below.

TABLE I

| | |
|---|---|
| Shore A hardness (ASTM D2240) | 85 |
| Density $\rho$ | 1,200 kg/m³ |
| Specific heat $C_p$ | 2,000 J/kg K |
| Characteristic temperature $Tc$ | 59.24° C. |

TABLE I-continued

| | |
|---|---|
| Thermal conductivity λ | 0.15 W/m K |

This composition was used to extrude a series of sleeves, using extrusion heads such as those shown in FIGS. 1 and 2 of the attached drawings, in which:

FIG. 1 is a diagrammatic and sectioned view of the extrusion head,

FIG. 2 is a partial detailed and sectioned view of the die refrigeration system.

The extrusion head shown in FIGS. 1 and 2 comprises an annular die 1 and an internal core 2 supported by means of core-support fins 3. The core comprises a central channel 4, and this enables a pressurized fluid, generally air, to be blown into the extruded sleeve, as is usual in all blown film extrusion equipment.

The end of the core and the end of the die are equipped with an annular refrigeration system 5 comprising two axially spaced chambers 6 and 7, connected together by an annular channel 8. In the die refrigeration system, one of the chambers is connected to a delivery conduit 9 for a refrigerant fluid, oil in this case, and the other to a conduit 10 for discharging this fluid.

The two chambers (11, 12) of the core refrigeration system are also and correspondingly connected to delivery 13 and discharge 14 conduits for a refrigerant fluid, which pass through the core 2 and one of the core-support fins 3.

The delivery (9, 13) and discharge (10, 14) conduits for the refrigerant fluid are equipped with a thermal insulation lagging, not shown, as are the refrigeration systems, except for their side facing the flow channel for the extruded resin.

FIG. 2 also shows the length L of the refrigeration zone, the height H of the die gap in the refrigerated zone and the distance $L_F$ between the die exit orifice and the downstream end of the refrigerated zone.

Table 2, below, repeats the data and the results of five different trials carried out according to the process of the invention. This table shows the different values assigned to the parameters H, $\overline{V}$, L and Tm, gives the limits which must be adhered to, according to the invention, in the case of the temperature To of the refrigeration fluid, especially as a function of these parameters, and mentions the mattness obtained during manufacture with a temperature To of the refrigerant fluid within the limits determined in accordance with the process of the invention. It is found that all the trials carried out result in a satisfactory mattness. It is found, furthermore, that the difference between the mean temperature Tm of the extruded resin and the temperature To to be imposed on the refrigerant fluid is generally greater than 60° C.

Lastly, by way of a comparative trial, the manufacturing trial 1 was repeated, all the conditions given in Table 2 being reproduced, but with a temperature of 120° C. being chosen for the refrigeration fluid, that is to say a temperature situated outside the zone of temperatures determined by the process according to the invention. It was found that, in this case, the mattness obtained amounts to 0.5 micron and that, consequently, the sleeve produced is not suitable for producing sterilizable packaging bags giving rise to no bonding problem.

TABLE 2

| TRIAL | D (mm) | H (mm) | L (mm) | $L_F$ (mm) | $\overline{V}$ (m/min) | Tm °C. |
|---|---|---|---|---|---|---|
| 1 | 94.9 | 0.85 | 6 | 0 | 3.65 | 190 |
| 2 | 94.9 | 0.85 | 18 | 12 | 4.1 | 190 |
| 3 | 94.9 | 0.85 | 6 | 0 | 4.7 | 190 |
| 4 | 68 | 0.7 | 18 | 12 | 12.2 | 190 |
| 5 | 67.4 | 1 | 18 | 42 | 5.9 | 190 |

| TRIAL | To limits according to the relationship given in the description | Experimental To °C. | Mattness microns | Remark |
|---|---|---|---|---|
| 1 | 85–118 | 110 | 8 | |
| 2 | 100–133 | 130 | 4 | high draw velocity |
| 3 | 79–112 | 100 | 6 | high draw velocity |
| 4 | 90–123 | 105 | 2 | high viscous heating |
| 5 | 91–124 | 97 | 6 | |

Trial 1: flat sleeve 180 mm in width, 0.35 mm in thickness: matting of the inner face
Trial 2: flat sleeve 160 mm in width, 0.35 mm in thickness: matting of the outer face
Trial 3: flat sleeve 160 mm in width, 0.35 mm in thickness: matting of the inner face
Trial 4: flat sleeve 130 mm in width, 0.35 mm in thickness: matting of the outer face
Trial 5: flat sleeve 120 mm in width, 0.35 mm in thickness: matting of the outer face.

We claim:

1. In a process for producing, by blown film extrusion, a sleeve of vinyl chloride-based resin, at least one face of which is matte in appearance and which is particularly suitable for producing optionally sterilizable packaging bags, in which at least one of the faces of the extruded sleeve is cooled superficially upstream of the exit orifice of the extrusion die (1) by means of a circulation of a refrigerant fluid, the improvement comprising the temperature To of the refrigerant fluid is chosen so as to satisfy the relationship:

$$Tm - \frac{0.04 \cdot Tc}{(1 - 0.32\ G^{0.1525})} - 35° C. \leq To \leq Tm - \frac{0.04 \cdot Tc}{(1 - 0.32\ G^{0.1525})} - 2° C.$$

in which:

Tm is the mean temperature of the resin at the die exit,

Tc is a temperature characteristic of the extruded resin and is given by the relationship:

$$Tc = \frac{RTm^2}{E}$$

in which E is the activation energy of the resin, measured by means of a capillary viscometer, at the temperature Tm, R being the universal gas constant, and G is given by the formula:

$$G = \frac{\rho\ C_p\ \overline{V}\ H^2}{\lambda L}$$

in which:

ρ is the density of the resin,
$C_p$ is the specific heat of the resin,
$\overline{V}$ is the mean extrusion velocity of the resin in the refrigerated part (L) of the die,
H is the height of the die gap in the refrigerated zone,
L is the length of the refrigerated zone, and
λ is the thermal conductivity of the resin.

2. Process according to claim 1, wherein the refrigeration is performed by a thin annular film of refrigerant fluid circulating in the direction of the extrusion axis.

3. Process according to claim 1, wherein the extruded sleeve is subjected to a drawing operation at a velocity of between 3 m/min and 13 m/min.

4. Process according to claim 1, wherein at the end of the die (1) the resin is passed through an abruptly reduced flow section.

5. Process according to claim 1, wherein the length of the refrigerated zone (L) varies between 3 and 30 mm and the downstream end of the refrigerated zone is situated at a distance of 0 to 60 mm from the exit orifice of the die (1).

* * * * *